Patented Jan. 15, 1946

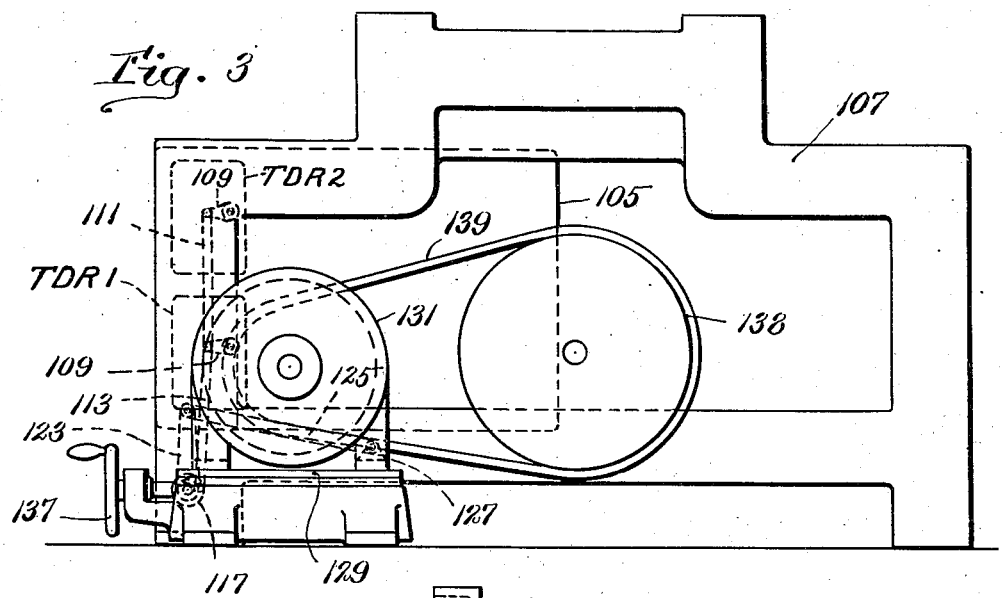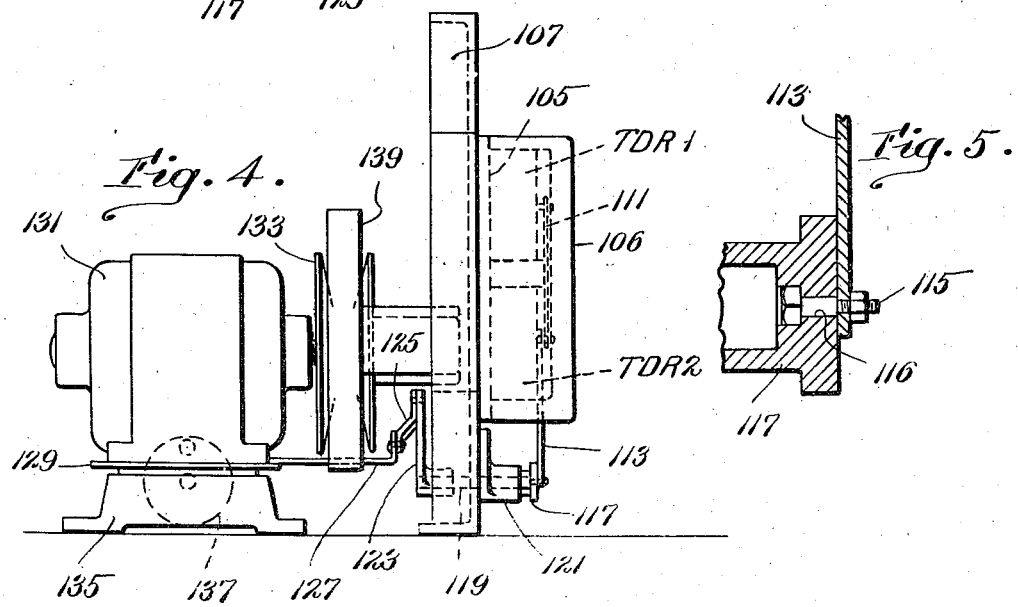

2,393,159

UNITED STATES PATENT OFFICE 2,393,159

SEAM PROTECTING DEVICES FOR CLOTH SHEARS

Wilfred N. Hadley, Springfield, Vt., assignor to Parks and Woolson Machine Company, Springfield, Vt., a corporation Application December 8, 1943, Serial No. 513,435

20 Claims. (Cl. 26—17)

This invention relates to cloth shearing machines utilizing rotary shear blades coacting with stationary ledger blades to shear the protruding fibers at the surface of the cloth to a uniform level of extent, the cloth being run rapidly through the machine and past these coacting blades in open and flat relation, being supported in close proximity to the blades usually by means of a rest solidly supporting the cloth at the shearing point or closely adjacent thereto. The spacing between this rest and the shearing blades is customarily so close that the increase in thickness of the traveling web caused by the seams joining successive pieces or cuts of cloth will result in cutting and damaging the cloth or injuring the shearing blade if allowed to enter this narrow space. To prevent this injury manual or automatic means are provided to suspend the shearing of the cloth during the passage of the seam, either by increasing this spacing, as by lifting the blades or dropping the rest, or by stopping or reversing the rotation of the rotary shearing blade. When the means for thus passing the seam without cutting it are automatic in their action, they are controlled and actuated by feelers or other detecting devices detecting and responding to the approach of the seam to the shearing point.

The present invention has particular relation to this latter class of automatic seam-protecting mechanisms and has among its objects the provision of novel and improved devices of this sort which shall be easier to set for various cloth-speeds and more accurate in their operation, whereby the chance of accidental cutting of the seam is eliminated or greatly reduced, and the length of unshorn cloth adjacent the seam is diminished, the proportion of finished and salable fabric in each piece being thus increased with obvious saving to the manufacturer.

To these ends, the invention comprises an automatic seam-protecting mechanism for either solid-rest or gap-rest single and multiple cloth shears having detector devices detecting the approach of a seam to the shearing point, means receiving and holding the impulse from the detecting devices for whatever length of time is necessary until the seam arrives within an inch or so of the shearing point, shearing-suspending devices which are thereupon actuated by an impulse from the said means to stop the shearing while the seam passes the shearing point, and additional means adjustable to suit the cloth's speed effecting a resumption of the shearing operation after the seam has passed the shearing point by an inch or so. In its preferred embodiment, the invention provides time delay devices easily and accurately set to provide any desired delay between the detection of the approach of a seam and its arrival at the shearing point, thus allowing the cloth to be run at widely differing speeds as required by different fabrics, and also enabling the seam-detector devices to be put at any suitable or desired location in the path of the cloth in advance of the shearing point. In addition, in its preferred form, the invention also provides means for accurately adjusting the moment of resumption of shearing and thus predetermining the duration of the suspension and the length of the unshorn area which includes the seam, and for automatically extending the period of suspension in case a seam reaches the shearing point in diagonal, bowed, or crooked relation. It further provides means for automatically making these necessary adjustments of the time delay between detection of the approach of the seam and the suspension of the shearing, and of the period between suspension and resumption, in the act of manipulation of the controls which govern the change in the cloth speed.

These provisions, as well as other aims of the invention, and the manner of their attainment, are as set forth hereinafter.

An illustrative embodiment of the invention is shown in the accompanying drawings, in which—

Fig. 1 is a diagrammatic end elevation of one section of a multiple blade cloth shear, showing only the parts immediately concerned with the invention, and illustrating the seam-detecting and shearing-suspending mechanism.

Fig. 2 is a wiring diagram of the automatic controls intervening between the seam-detecting devices and the shearing-suspending devices of Fig. 1, and governing the actuation of the latter devices, and also showing in simplified diagrammatic manner the connections to the detecting and shearing-suspending devices of the several blades of a multiple shear having three blades or shearing sections, such as shown in Fig. 1.

Fig. 3 is a side elevation of the variable speed drive for the cloth in the multiple shear of Figs. 1 and 2, showing the means for automatically varying the periods of delay and the times of suspension and resumption of shearing to match the changes in cloth speed.

Fig. 4 is an end elevation of the same, viewed from the right-hand end.

Fig. 5 is a detail of parts of Fig. 4.

Figure 1:
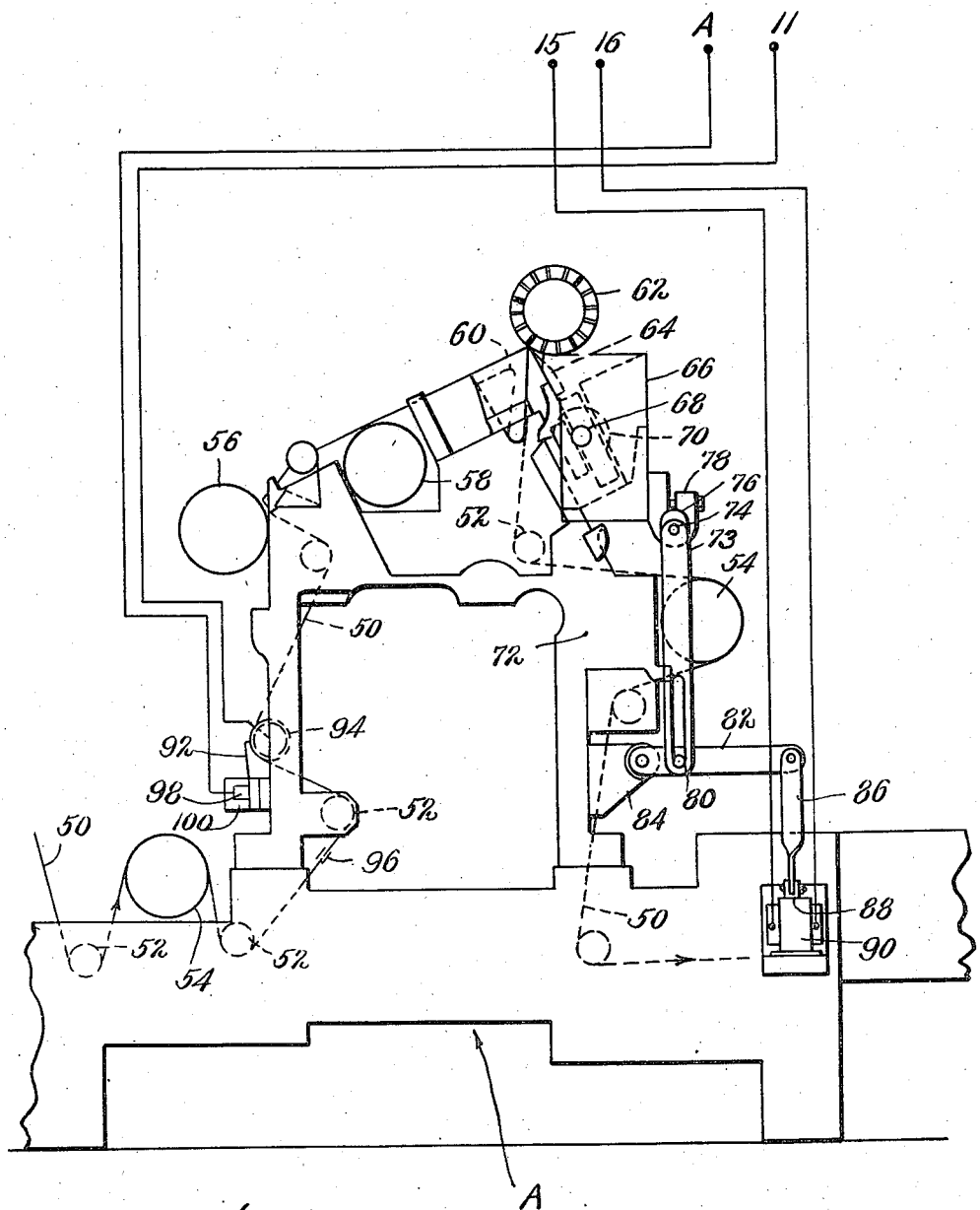
Figure 2:
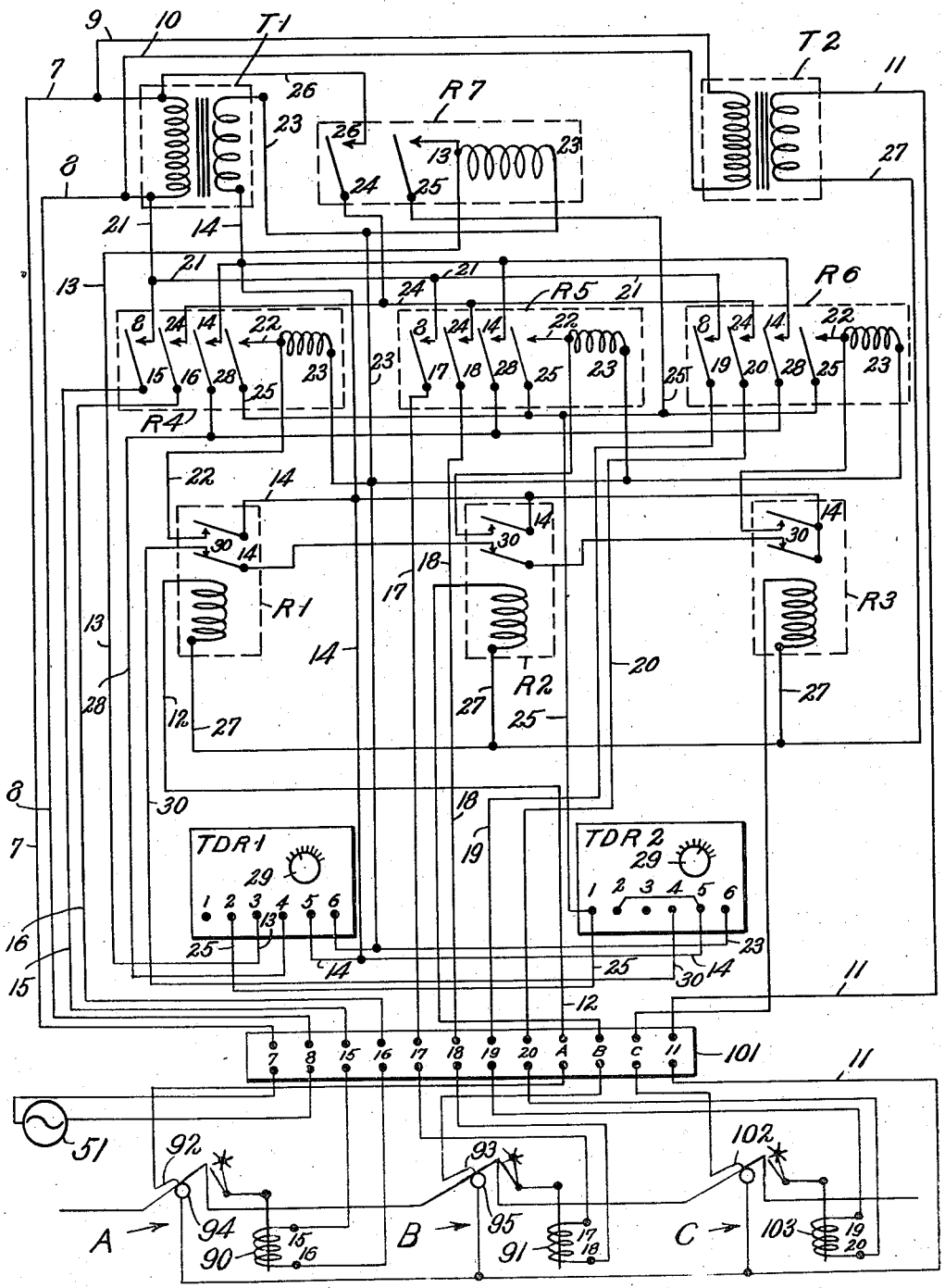

The invention is shown embodied in connection with a three-blade Parks & Woolson multiple shear, of which the three shearing sections are indicated diagramatically at A, B and C respectively in connection with the wiring diagram in Fig. 2. A more detailed but still diagrammatic showing of a single shearing section of the three in Fig. 2, herein the first section A, is presented in Fig. 1, in which the cloth 50 travels in the direction of the arrows around various guide-rolls 52 and feed-rolls 54, past the raising brush 56 and clearer brush 58 and over the sharp top edge of the cloth-rest 60, where the protruding fibers are sheared by the coaction of the usual continuously revolving spiral-bladed knife 62 and the ledger blade 64, both of which are mounted on a carriage including brackets 66 which swings about a shaft 68 mounted in brackets 70 on the machine frame 72. The blade frame is swung clockwise about shaft 68 to lift the blades away from the cloth passing over the acute edge of cloth-rest 60 in order to pass the seam in the cloth, by a link 73 attached to an eccentric pin 74 in the end of a rod 76 fixed in a clamp 78 on bracket 66 with capacity for angular adjustment, while the other end of link 73 is pivotally attached at 80 to a lever 82 fulcrumed on a bracket 84 on the machine frame and having its free end pivotally connected to a link 86 pivoted to the armature 88 of a solenoid magnet 90. When the solenoid is actuated to draw down its armature, the blade carriage is rocked clockwise and the blades are retracted from the cloth to suspend the shearing while the seam is passing the shearing point.

To detect the approach of the seam to the shearing point, any suitable detecting devices on the order of those set forth in my Patents Nos. 2,321,481 and 2,321,482 and 2,375,732 are provided, in the illustrated embodiment comprising a plurality of spring feeler wires 92 all having their tips bent at a sharp angle and resiliently pressing against the cloth 50 where the latter travels around a metallic-surfaced platen roll 94 revolving freely in bearings in frame 72, the feeler wires 92 recurring at intervals of an inch or less either continuously or in spaced groups across the width of the cloth and thus forming a comb-like structure. Apertures are purposely formed in the web of cloth 50 at or in predetermined relation to the seams 96, whereby the tips of one or more of the feeler wires 92 make electrical contact with the surface of platen roll 94, to complete an electrical circuit and thus to start an impulse which eventually results in the energizing of solenoid 90 to lift the blades and suspend the shearing long enough to let the seam 96 pass the blades.

The feeler wires are mounted in electrical connection with a bar 98 mounted in insulating brackets 100 on the machine frame, this bar being connected by a wire or lead to post A on terminal board 101, Fig. 2, while the platen roll 94 is connected by a wire to post 11 on board 101. Likewise, the leads by which solenoid 90 is energized are brought to posts 15 and 16 respectively on the board 101. Similarly, in the second and third shearing unit B and C of the three-blade shear, the leads from the feeler combs respectively run to posts B and C on board 101, while the corresponding platen rolls are connected to the common return wire attached to post 11 on the board; the leads from the solenoids of units B and C are brought out to posts 17, 18, and 19, 20, respectively, on board 101.

The main current supply, herein 440 volts, is brought to posts 7 and 8 on board 101 by suitable mains from a source of alternating current 51, whence it is carried by leads 7, 8, to the terminals of the high-voltage winding of a step-down transformer T1, and by further leads 9, 10, to the high voltage side of a second step-down transformer T2. The 12-volt output of the low voltage winding of T2 is employed in the circuits completed between feeler wires 92 and platen-roll 94, to obviate fire and shock hazard at these points; the 110-volt output of the low voltage winding of T1 is utilized to work the relays which effect the timing of the suspension and resumption of shearing; while 440-volt current is impressed on the windings of the solenoid 90 to effect the actual lifting of the knives.

When contact is made between feeler-comb 92 and platen roll 94 of the first section A of the shear, by way of the apertures purposely formed in or adjacent the seam, 12-volt current flowing via lead 11 to post 11 and thence via the continuation of lead 11, forming the common return wire, through the platen roll and feeler-comb to post A travels through lead 12 to a relay R1, through the coil thereof, and back via lead 27 to T2. This energizes the coil of R1 momentarily, drawing down the contact makers of such relay to supply 110-volt current from T1 via leads 14 and 22 to the coil of relay R4, the circuit being completed via lead 23 to T1. This moves the armature of R4 to cause all four of its contact makers to complete their contacts. The closing of a branch of lead 22 to lead 25 by one of these contacts holds R4 closed, through the medium of the normally closed connection established between posts 1 and 2 within a time relay relay TDR2, a commercial timer device of known form giving accurate and adjustable periods of delay in transmitting an electrical impulse; post 2 of this relay is for this purpose connected by jumper with post 5 thereof, which completes the circuit of 110-volt current via lead 14. The action described so far occurs instantly with no time delay. The same closing movement of the armature of R4 connects a branch of wire 8 with a lead 15 running through post 15 on board 101 to solenoid 90 of shearing unit A, and also connects the return lead 16 from the solenoid to a lead 24 running to a normally open contact in a power relay R7. The circuit is thus pre-set to solenoid 90. The actuation of R7 in due course by the time delay relay TDR1 causes one of the contact makers of R7 to connect lead 24 with branch 26 of wire 7 carrying the available line voltage, such as 440 volts, thus energizing solenoid 90 of section A to lift the blades clear of the cloth and suspend the shearing.

The same movement of the contact makers of R4 puts a branch of lead 14 into connection with a lead 28 running to post 4 on a time relay relay TDR1, identical in construction with TDR2, thus in effect connecting posts 4 and 5 thereof together which in accordance with the manner of construction and operation of these timers starts TDR1 to measure off the definite time delay for which it is set by means of its potentiometer knob 29 and accompanying scale. Both TDR1 and TDR2 are supplied with 110-volt current by branches of leads 14 and 23 from T1 running to posts 5 and 6 respectively on the time delay relays. At the expiration of this measured interval of time, TDR1 acts to make internal contact between its posts 2 and 3, and thus to put the branch of lead 25, connected to its post 2, into connection with lead 13 attached to its post 3, thus supplying 110-volt current from T1 via lead 14 and the normally closed contact between posts 1 and 2 of TDR2, and the said branch of wire 25, into the coil of R7, thus sending 440-volt current via leads 26, 24, through R4 and via leads 16, 15, and 8 into the solenoid 90 to lift the blades and suspend the shearing.

It is noted that when R7 is energized by the action of TDR1, a holding circuit is established between a branch of lead 25 and one end, 13, of the coil of R7, whereby TDR2 holds R7 in action so long as TDR2 maintains its internal connection between its posts 1 and 2.

In each relay TDR1 and TDR2, the construction is such that posts 1 and 2 are normally connected, and that connecting post 4 to 5 causes this device to start measuring off its time and at the expiration of the period of delay for which the device is set, to break this connection between posts 1 and 2 and establish a connection between posts 2 and 3 which remains so long as post 4 is kept connected to post 5; but when connection between posts 4 and 5 is broken, the connection between posts 1 and 2 is reestablished and that between 2 and 3 is interrupted. The action of R1 in actuating R4 to cause the latter to make connection between posts 4 and 5 of TDR1 and thus start the delay relay measuring off its time, and thereafter making contact between its posts 2 and 3 to actuate R7 has just been explained. The same momentary action of R1 in response to feeler contact, however, has already broken an otherwise constant connection between posts 4 and 5 of TDR2, by opening a normally closed contact in R1 between a branch of lead 14 to post 5 and a lead 30 running to post 4 of TDR2. As the timing period of TDR2 is initiated by connecting points 4 to 5 thereof as seen, and as these points are normally kept connected by R1, TDR2 stands normally in its timed-out relation, i. e., at the end of its cycle, with internal connections broken between its posts 1 and 2. The opening of the contacts in R1 between leads 14 and 30 thus re-sets TDR2 to start on another timing cycle, its points 1 and 2 being thus instantly connected to provide for the circuit which holds R4 energized to permit the other timer to time out and lift the blades to suspend the shearing, TDR2 itself then timing out a brief but accurately measured and adjustable fraction of a second later to open the contact between its posts 1 and 2 and thus drop out R4 and R7 with resultant de-energizing of solenoid 90 and allow the shearing blades to fall back and resume the shearing immediately after the seam has passed the shearing point.

If the approach of a crooked seam should cause a second or even more actuations of the feeler devices before this entire cycle of suspending and resuming the shearing shall have been completed, the resultant momentary interruption of contact between leads 14 and 30 in R1 merely resets TDR2 back to the beginning of a fresh cycle, still without breaking the connection between its posts 1 and 2, thus extending the delay produced by this timer beyond its normal period. The action of TDR1 is not changed by the second feeler impulse, but functions to cause the lifting of the blades in time to clear the first end or portion of the seam, because its action is initiated by R4, which remains unaffected by a second or otherwise repeated action of R1 during the cycle of TDR1. Thus, only the moment of resumption of the shearing action is postponed and the length of the jump of the knives is extended to include the whole crooked seam, with resultant avoidance of damage to the fabric or the blades through cutting the seam.

As is obvious, since TDR1 and TDR2 start measuring off their intervals of time at the same instant, and the former controls the instant of suspension of the shearing while the latter controls the instant of resumption of shearing, the control knob 29 of TDR2 is set to produce a slightly longer delay than TDR1. That is, TDR1 measures off accurately the length of time needed for the seam to travel from its location at the moment when its approach is detected by feeler 92, to a predetermined location as close to the shearing point as is deemed safe; while TDR2, starting to run at the same instant as its companion device and by the same feeler impulse, is set to run a fraction of a second longer than TDR1, this additional time measuring the duration and hence the length of the jump of the knives to clear the seam, these time settings being made in due accord with the speed of travel of the cloth. By reason of the accuracy of the organization set forth herein, sure and safe clearance of a trimmed and butted seam is attained even at cloth speeds up to 60 yards per minute with a total jump of only 2 inches, which means that only this 2-inch band of unshorn length of cloth must be discarded from the finished fabric, with obvious saving over prior practice.

When the seam arrives successively at the second and third shearing sections B and C of the multiple shear, substantially identical sequences of operations are initiated. Thus, when feeler wires 93 make contact with platen roll 95 of section B, 12-volt current from T2 momentarily energizes R2, similar to R1, this in turn energizing R5, corresponding to R4 of section A of the shear, thus pre-setting the 440-volt circuit via leads 17 and 18 to solenoid 91, and also starting TDR1 and TDR2 to measure off their respective times. When TDR1 runs out its time, it actuates master relay R7 as before, thus closing the contact between leads 26 and 24 to put 440-volt current into solenoid 91 via leads 17 and 18. A fraction of a second later, TDR2 times out, opening the connection between its posts 1 and 2 and releasing relays R5 and R7 to permit the knives to resume shearing relation with the cloth.

In substantially identical manner, feeler 102 of section C of the cloth shear actuates R3 and R6 to cause TDR1 and TDR2 to control the actuation of power relay R7 and thus the action of solenoid 103 to jump the blades of this section over the seam.

As noted, the settings of TDR1 and TDR2 must be made in proper accordance with the speed of travel of the cloth. Hence these settings must be accurately reset whenever the cloth speed is varied. Since occasions for varying the cloth speed arise frequently, I have provided means, of which one form is shown in Figs. 3 to 5, for linking the controls of the time delay relays directly to the devices governing the rate of travel of the cloth through the shear, so that the relay controls will be automatically and mechanically shifted to match the speed of the cloth, without the need for independent manual setting of the periods of delay of the two relays, with resort to trial and error and the incidental trouble and times loss and possibility of injury to the cloth or to the knives thus involved. For this purpose, the panel 105 on which TDR1 and TDR2 and the other relays and transformers are mounted, together with its cover 106, are fastened to the inside of one of the end frames 107 of the shear, adjacent the variable speed driving unit which provides the power propelling the cloth through the shear. A short arm 109 is fixed on the control shaft of each time delay relay, and these two arms are connected together by a link 111 the end of which is attached by a second link 113 to a bolt 115 eccentrically disposed in a hub 117 fixed on one end of a rockshaft 119 in a bearing 121 on frame 107. The other end of the rockshaft has fixed thereon an arm 123 connected by link 125 to the upturned end of an arm 127 rigidly fixed on the base or slide 129 carrying the motor 131 and variable diameter pulley 133 of the variable speed drive. By this arrangement, when the motor 131 is shifted on its base 135 by rotation of hand-wheel 137 and the adjusting screw connected therewith to move it toward the driven pulley 138, so that the tension of V-belt 139 is slackened and pulley 133 expands to increase the speed imparted to driven pulley 138, the control shafts of TDR1 and TDR2 are rotated counter-clockwise to cut down the time delay in exact accord with the increase in the speed of travel of the cloth produced by the usual connections (not shown) between the shaft of pulley 138 and the feed-rolls of the shear. A corresponding increase in the time delay produced by each unit is effected when the motor 131 is moved reversely on its base to slow down the speed of cloth travel.

The setting and adjustment of the extent of rotation of the control shafts of the two time delay relays by the linkage so that the suspension will always occur just as the seam arrives within an inch or two of each successive shearing point, regardless of changes in cloth speed, is effected by mounting the eccentric bolt 115 for adjustment radially in a slot 116 extending diametrically across the end of hub 117. This adjustment is ordinarily needed and effected only in setting up the machine, and once found the compensation for changes in cloth speed is made automatically by the act of moving the control governing the cloth speed. As is obvious, the nearer the bolt 115 is set to the axis of the hub 117, the less will be the throw of the control shafts of the relays for a given degree of shift of motor 131 and of change in the rate of travel of the cloth. To vary the length of jump, the angular throw of the control shaft of TDR2 that is within the hub of its arm 109 is increased slightly over that given the control shaft of TDR1, as by shifting slightly in a radial direction the operative position of the pivot connecting arm 109 of TDR2 with its link 111 to shorten the effective length of such arm. This causes the duration of the suspension of shearing to be varied automatically in proportion to the changes in cloth speed, so that the length of unshorn fabric adjacent the seams that is jumped by the shearing knives remains constant regardless of the cloth speed.

In lieu of this mechanical linkage to the controls of both timers, means is sometimes provided for increasing or shortening the timing periods of both timers, by varying the electrical circuits within the two timers simultaneously, the setting of a potentiometer or other control device common to both timers being for this purpose varied in proportion to the movement of the controls governing the cloth speed.

While I have illustrated and described certain forms in which the invention may be embodied, I am aware that many modifications may be made therein by any person skilled in the art, without departing from the scope of the invention as expressed in the claims. Therefore, I do not wish to be limited to the particular forms shown, or to the details of construction thereof, but what I do claim is:

1. In a cloth shear, in combination, means propelling, guiding, and shearing the cloth, means suspending the shearing to pass a seam in the cloth, detector devices detecting the approach of a seam to the shearing point, means receiving and holding an impulse from the detector devices until the seam arrives in proximity to the shearing point, and thereupon transmitting such impulse to the shearing-suspending means to stop the shearing while the seam passes the shearing point, and addtional means adjustable to suit the cloth's speed effecting a resumption of the shearing operation after the seam has passed a predetermined distance beyond the shearing point.

2. In a cloth shear, in combination, means propelling, guiding, and shearing the cloth, means detecting the approach of a seam to the shearing point, means actuated by such detecting means suspending the shearing to pass the seam, and means variably predetermining both the delay between such detection and the suspension of the shearing, and also the duration of the suspension.

3. In a cloth shear, in combination, means propelling, guiding, and shearing the cloth, means detecting the approach of a seam portion to the shearing point, means actuated by such detecting means suspending the shearing to pass the seam, timer means adjustably predetermining a constant time delay between detection and suspension, and timer means set in action by the detecting means and adjustable to effect a predetermined minimum duration of the suspension of shearing and automatically extending the duration of suspension if a second seam portion is detected after detection of the first seam portion but before resumption of shearing.

4. In a cloth shear, in combination, means propelling, guiding, and shearing the cloth, means detecting the approach of a seam to the shearing point, means actuated by such detecting means suspending the shearing to pass the seam, a timer set in action by the detecting means and intervening between such means and the shearing-suspending means to delay the action of the latter, and a second timer also set in action by the detecting means terminating the action of the shearing-suspending means.

5. In a cloth shear, in combination, means propelling, guiding, and shearing the cloth, means detecting the approach of a seam to the shearing point, means suspending the shearing to pass the seam, and two timers put in action by the detecting means, one thereof actuating the shearing-suspending means after a delay, and the other effecting resumption of the shearing after a further delay.

6. In a cloth shear, in combination, means propelling, guiding, and shearing the cloth, means detecting the approach of a seam to the shearing point, means suspending the shearing to pass the seam, and two timers put in action substantially at the same time by the detecting means, one thereof actuating the shearing-suspending means after a delay, and the other effecting resumption of shearing after a further delay.

7. In a cloth shear, in combination, means propelling, guiding, and shearing the cloth, means detecting the approach of a seam to the shearing point and completing an electrical circuit upon such detection, electro-magnetic means suspending the shearing, a time delay relay set in action, by completion of such circuit, to energize the electro-magnetic means after delay, and a second time delay relay acting to de-energize the electro-magnetic means.

8. In a cloth shear, in combination, means propelling, guiding, and shearing the cloth, means detecting the approach of a seam to the shearing point and completing an electrical circuit upon such detection, electro-magnetic means suspending the shearing, a time delay relay set in action by completion of such circuit and acting to energize the electro-magnetic means after delay, and a second time delay relay acting to de-energize the electro-magnetic means after lapse of a predetermined minimum time following the completion of the circuit by the detecting means.

9. In a cloth shear, in combination, means propelling, guiding, and shearing the cloth, means detecting the approach of a seam to the shearing point and completing an electrical circuit upon such detection, electro-magnetic means suspending the shearing, a time delay relay set in action by completion of such circuit and acting to energize the electro-magnetic means after delay, a second time delay relay acting to de-energize the electro-magnetic means after lapse of a predetermined minimum time following the completion of the circuit by the detecting means, and means adjusting the respective periods of delay.

10. In a cloth shear, in combination, means propelling and guiding the cloth, shearing means shearing the cloth at a plurality of points in its passage through the shear, means associated with each shearing means to detect the approach of a seam in the cloth, means associated with each of the shearing means suspending the shearing action, and timing means common to all the shearing-suspending means actuating the latter successively to suspend the shearing as the seam reaches each shearing point in turn.

11. In a cloth shear, in combination, means propelling, guiding, and shearing the cloth, means detecting the approach of a seam in the cloth to the shearing point and closing an electric circuit upon such detection, means suspending the shearing to pass a seam, a power relay actuating the shearing-suspending means when energized, and time delay relays set in action by the closing of the said circuit and respectively energizing and de-energizing the master relay after delay.

12. In a cloth shear, in combination, means propelling, guiding, and shearing the cloth, means detecting the approach of a seam in the cloth to the shearing point and closing an electric circuit upon such detection, means suspending the shearing to pass a seam, a relay actuated upon closing such circuit, a holding relay actuated by the first relay, time delay relays set in action by the said relays, and a power relay energized by one of the time delay relays after delay and de-energized by the other time delay relay after further delay.

13. In a multiple cloth shear, in combination, means propelling and guiding the cloth, a plurality of shearing units shearing the cloth at spaced points in the length thereof, each having electrically-operated means suspending its shearing action and also devices detecting the approach of a seam to the shearing point, separate relay means for each unit including circuit-holding devices each actuated by its associated detecting device, and a power relay transmitting power successively to the several shearing-suspending means as the separate relay means are actuated.

14. In a multiple cloth shear, in combination, means propelling and guiding the cloth, a plurality of shearing units each having means to detect the approach of a seam and means suspending its shearing action, power means common to all units for actuating the shearing-suspending means, and timing devices common to all units co-ordinating the actuation of each shearing-suspending means with the arrival of the seam at the shearing point of such unit.

15. In a multiple cloth shear, in combination, means propelling and guiding the cloth, a common power means, a plurality of shearing units each having means to detect the approach of a seam and also electro-magnetic means suspending its shearing action which latter means is put in communication with the power means by the seam-detecting means, and time delay devices controlling the common power means and variably predetermining the moment and duration of its actuation to energize the electro-magnetic means.

16. In a multiple cloth shear, in combination, means propelling and guiding the cloth, a source of electric power, a plurality of shearing units each having a seam-detector and electro-magnetic seam-passing devices, a switch connected to the power source selectively put in connection with the electro-magnetic seam-passing devices of a unit by the action of the seam-detector of such unit, and time delay devices closing the switch after a predetermined period of delay and re-opening it after a further predetermined minimum period of delay.

17. In a multiple cloth shear, in combination, means propelling and guiding the cloth, a plurality of shearing units each having a seam-detector and electro-magnetic shearing-suspending means, a plurality of relays each connected to one of the seam-detectors, a plurality of holding relays each actuated by a particular one of the first relays, a power relay providing actuating power for the electro-magnetic shearing-suspending means of all the shearing units, and selectively put in connection with the shearing-suspending means of a given unit by the holding relay of such unit, a time delay relay set in action by each of the seam-detectors in turn and acting after a predetermined and adjustable delay to actuate the power relay to suspend the shearing of the shearing unit associated with the particular seam-detector actuating the time delay relay, and a second time delay relay set in action by the same seam-detector at substantially the same time and de-energizing the power relay to cause resumption of shearing by this unit after delay.

18. In a cloth shear, in combination, shearing means, seam-detecting and shearing-suspending means, means propelling the cloth at variable speeds, timing devices powered independently of the cloth-propelling means producing delay between the action of the seam-detecting means and the actuation of the shearing-suspending devices, and means connecting the propelling means and the timing devices causing automatic variation of the length of the delay in response to variation in the speed at which the cloth is propelled.

19. In a cloth shear, in combination, shearing means, seam-detecting and shearing-suspending means, means propelling the cloth at variable speeds, timing devices powered independently of the cloth-propelling means producing delay between the action of the seam-detecting means and the actuation of the shearing-suspending devices, and means automatically varying the setting of the timing devices to vary the length of the delay as the cloth speed is varied.

20. In a cloth shear, in combination, means propelling, guiding, and shearing the cloth, means detecting the approach of a seam to the shearing point, means powered independently of the cloth-propelling means set in action by the detecting means and suspending the shearing for a predetermined minimum interval of time, and means connected with the propelling means automatically varying the duration of such suspension of shearing in accordance with variation in the speed of travel of the cloth.

WILFRED N. HADLEY.